United States Patent [19]
Brooks et al.

[11] 3,926,006
[45] Dec. 16, 1975

[54] METHOD AND APPARATUS OF FREEZING A PLUG IN A PIPE FOR PRESSURE TESTING

[75] Inventors: Leon E. Brooks; James T. White, both of Shreveport, La.

[73] Assignee: Cap-Con International, Inc., Shreveport, La.

[22] Filed: Apr. 9, 1973

[21] Appl. No.: 348,961

[52] U.S. Cl. .................... 62/66; 62/293; 138/97
[51] Int. Cl.[2] .......................................... F16L 55/16
[58] Field of Search ............ 62/293, 66; 138/99, 97

[56] References Cited
UNITED STATES PATENTS

| | | | |
|---|---|---|---|
| 2,320,506 | 6/1943 | Bennett | 62/59 |
| 3,041,850 | 7/1962 | Nunn | 62/293 |
| 3,561,490 | 2/1971 | Little | 138/97 |
| 3,674,031 | 7/1972 | Weiche | 62/293 |
| 3,695,301 | 10/1972 | Pittman | 62/293 |

*Primary Examiner*—William E. Wayner
*Attorney, Agent, or Firm*—Howard E. Moore; Gerald G. Crutsinger

[57] ABSTRACT

A method and apparatus for freezing a plug in a pipe to provide a closure for pressure testing the pipe, consisting of positioning a heat exchanger about the pipe, and closing off a section of the pipe inside the heat exchanger to prevent thermal circulation of fluid in the pipe outwardly of the area enclosed by the heat exchanger, to thereby lower the freezing time of the ice plug and assure more uniform freezing thereof. Isolation of the area within the heat exchanger can be accomplished by positioning sealing devices at each end of the area to block the flow of convection currents. Such sealing devices may consist of bodies moved through the pipe having sealing elements thereon in wiping engagement with the pipe, or inflatable sealing members which may be placed in the pipe and then inflated to provide sealing engagement with the wall of the pipe. The flanged bodies may be moved through the pipe by hydraulic pressure, and means is provided for moving, detecting and stopping said bodies at the correct location within or adjacent to the freezing area in the heat exchanger. Such means comprises brakes in the body actuated by ultrasonic frequencies from exteriorally of the pipe and a valve closing a central passage therethrough which may be closed or opened by ultrasonic frequencies from exteriorally of the pipe to permit flow through said bodies after being positioned in place and to close same to allow same to be moved through the pipe by hydromatic pressure and to isolate the area within the freezing zone in the heat exchanger.

5 Claims, 5 Drawing Figures

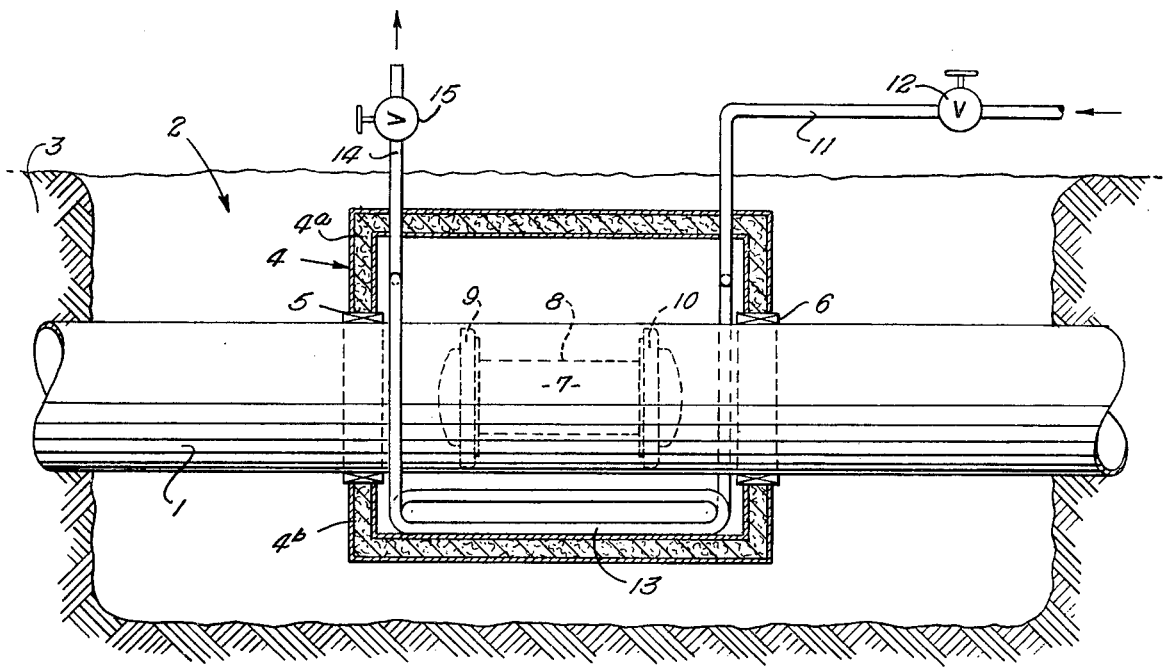
Fig. I
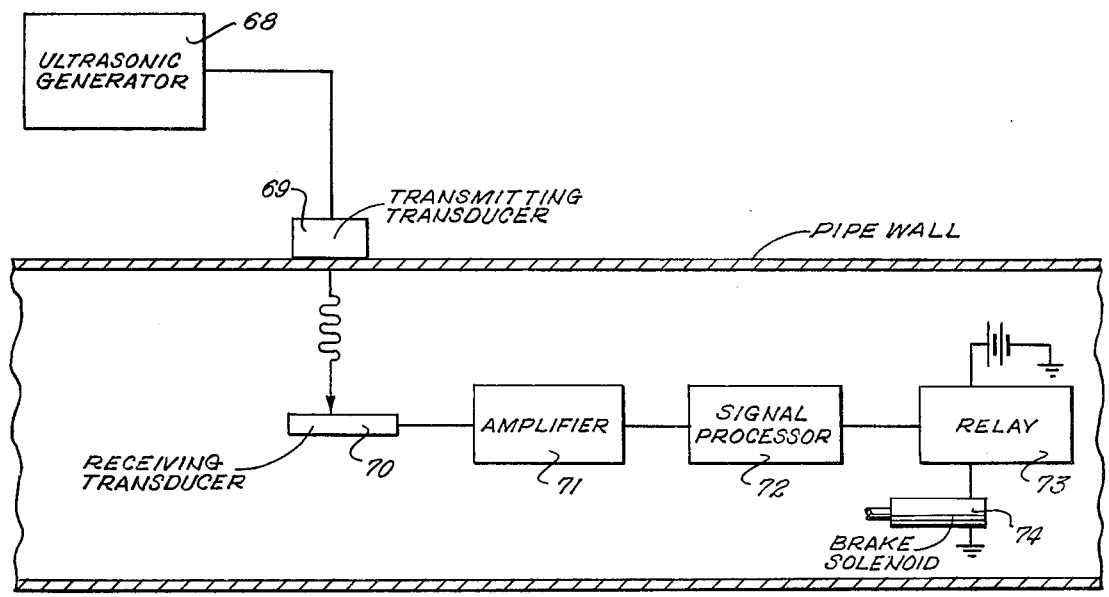
Fig. II

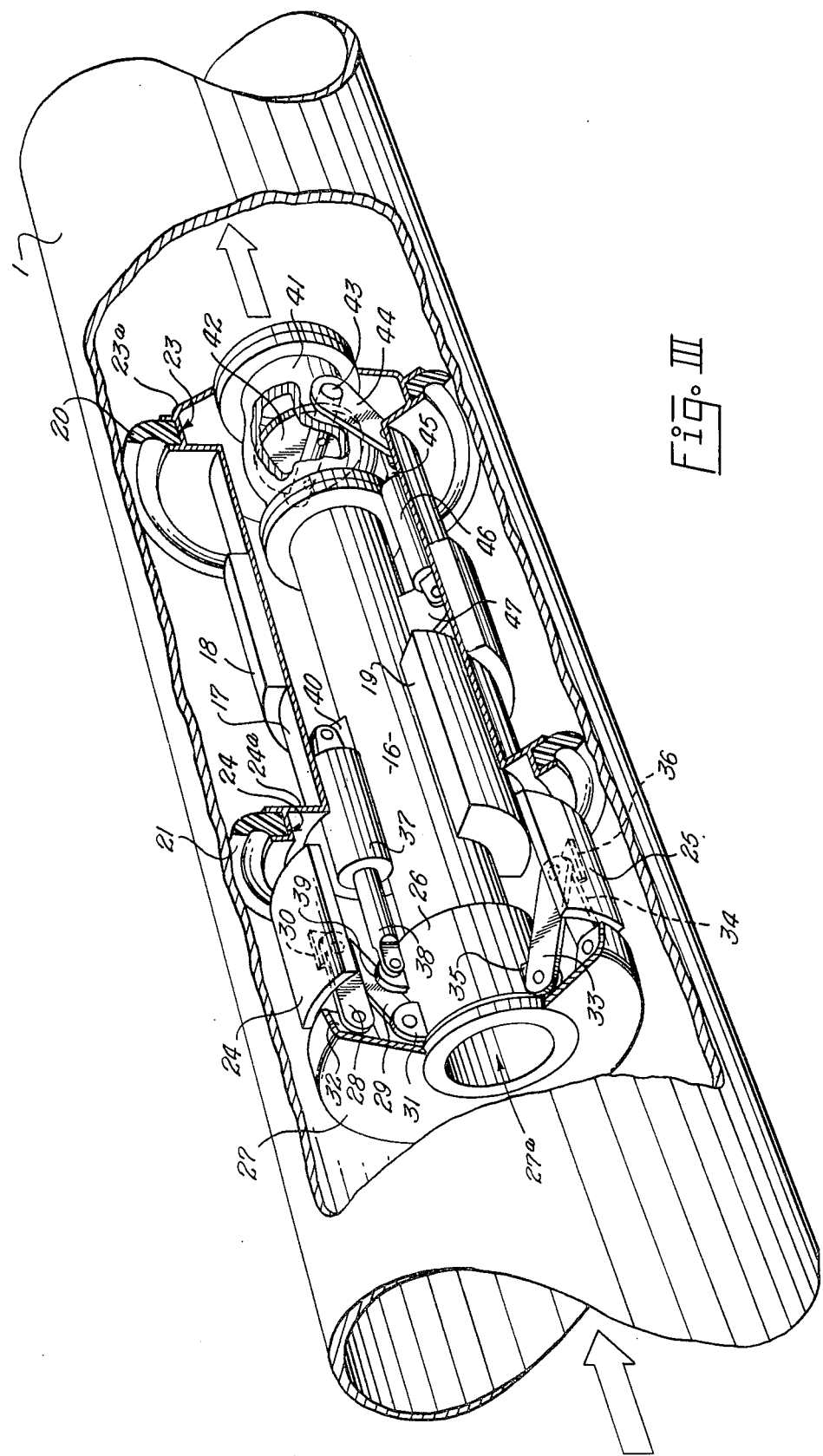
Fig. II

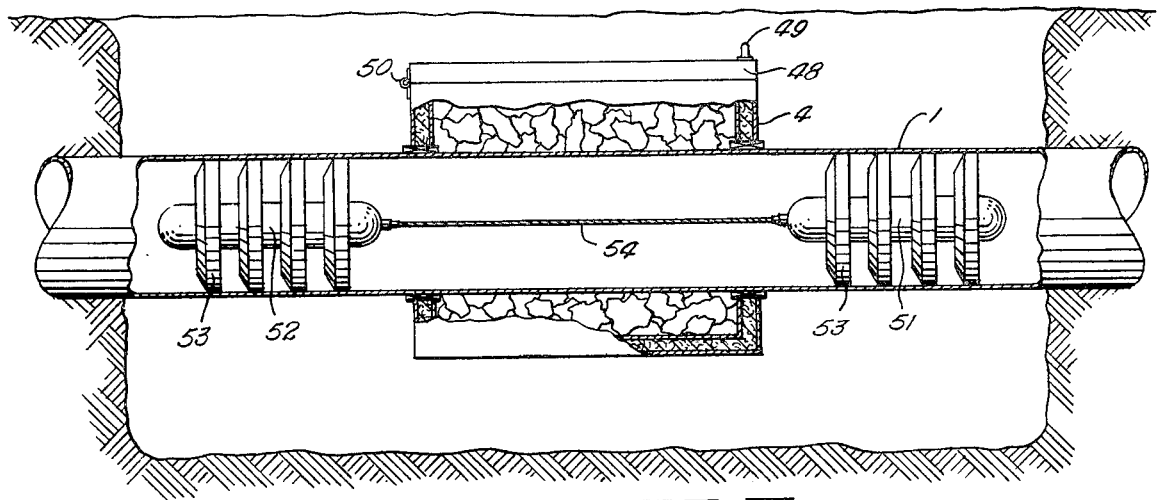
Fig. IV
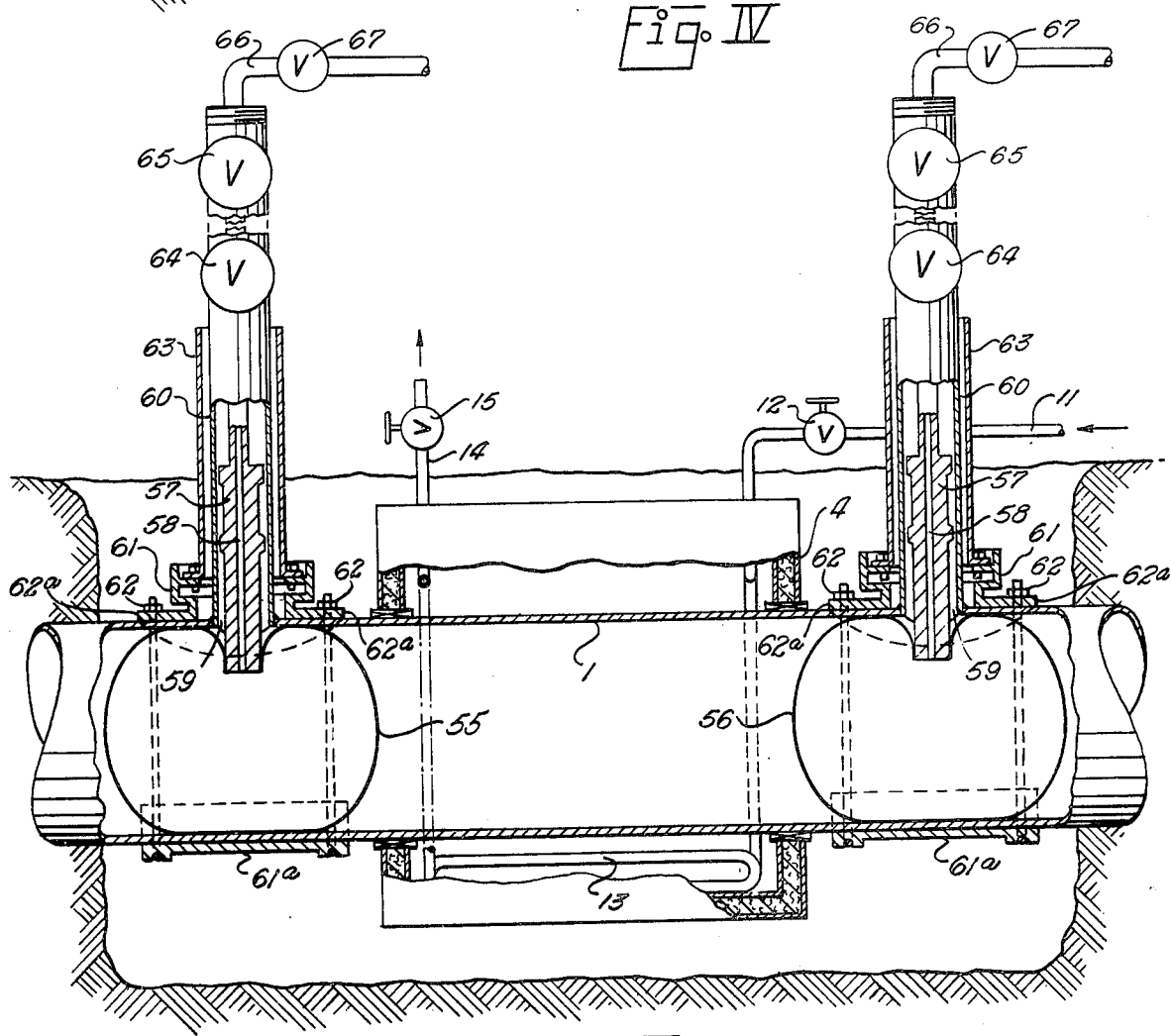
Fig. V

METHOD AND APPARATUS OF FREEZING A PLUG IN A PIPE FOR PRESSURE TESTING

BACKGROUND OF THE INVENTION

It is desirable to check underground pipelines periodically for leaks, particularly oil and gas transportation lines, wherein leakage can result in considerable economic loss and damage. The accepted method of testing such lines is to close off a section of the line and subject it to pressure to sufficient magnitude to expose leaks or weak points therein. It has been the practice in the past to close off the pipe line at spaced intervals by digging a hole to expose the line, severing the line, and welding a cap or plate thereover. This is an expensive and cumbersome procedure.

It has been proposed, as exemplified by Bennett et al. U.S. Pat. Nos. 2,257,727 and 2,320,506 to freeze a plug in the pipe to close same by positioning a heat exchanger thereabout and place a mixture of dry ice and gasoline or alcohol within the heat exchanger about the pipe to freeze water therein.

However, as disclosed in said patents such procedure was fraught with certain shortcoming, such as the difficulty of securing the freezing of the plug internally. It was attempted to solve this problem by placing a thermal conductor, such as a copper chain, internally of the pipe adjacent the area to be frozen. This, of course, required the severing of the pipe to insert the chain and the subsequent closure of the opening therein.

It is a recognized phenomena that, for reasons not entirely evident, ice can sustain extremely high pressures which cannot be predicted by an analysis of the properties of ice. For instance, it has been found that in a 26 inch O.D. pipe an ice plug frozen therein successfully withstood pressures in excess of 1800 pounds p.s.i. wherein a total longitudinal thrust of approximately 900,000 pounds was exerted.

In order to take advantage of this phenomena we have developed a method and apparatus of freezing ice plugs in pipes which overcomes the problem exemplified by the aforesaid Bennett et al. patents, and at the same time provides a convenient and relatively inexpensive method of pressure testing pipes without the necessity of severing the pipe at each position where it is to be closed.

In carrying out experiments relating to freezing plugs in a pipe it was discovered that a thermal gradient exists between the top and bottom of the pipe within the heat exchanger during the freezing process. This resulted in density variations of the fluid within the pipe which caused circulation currents in the pipe adjacent to and beyond the ends of the heat exchanger which dissipates refrigeration from the plug area and draws unrefrigerated fluid thereinto, thus preventing the freezing of a plug in the pipe of sufficient thickness and rigidity to withstand testing pressure.

BRIEF DESCRIPTION OF THE INVENTION

In order to overcome the aforedescribed problem we position blockage seals within the pipe to provide a confined area in the pipe within the heat exchanger, thus preventing convection currents flowing out of and into the area wherein the plug is being frozen. Such blocking seals may be provided by flanged plugs movable through the pipe by hydraulic pressure, having wiper elements thereon in wiping and sealing engagement with the wall of the pipe to provide a confined area therein which is positioned within the heat exchanger extending about the pipe. Suitable control means is provided for detecting the movable seal bodies and stopping same at the desired location from exteriorally of the pipe and for positioning a plurality of such seal bodies at desired spaced locations within the pipe.

Such control means is provided by ultrasonic frequency actuated brakes on the body and ultrasonic frequency actuated valve in the central passage through the body which may be opened or closed to allow circulation of fluid therethrough or to permit the movement thereof through the pipe by hydraulic pressure exerted thereagainst.

In an alternate form blocking seals are provided by inflatable bags which may be inserted into the pipe through passages provided through the wall thereof and then inflated therein to provide closure seals in the pipe at each end of the heat exchanger.

It is therefore a primary object of the invention to provide a method of forming an ice plug in a pipe by positioning a heat exchanger thereabout, placing within the heat exchanger, or circulating therethrough, coolant, and blocking off an area in the pipe within the heat exchanger to prevent convection currents outwardly of the freezing area during the freezing of the plug therein.

Another object of the invention is the provision of means to detect and position the block-off means in the pipe at a desired location, without the necessity of severing or rupturing the pipe.

A further object of the invention is to provide a close-off plug which may be moved through the pipe by hydraulic pressure and which may be stopped at a desired location in the pipe by means positioned exteriorally of the pipe.

A still further object of the invention is the provision of a close-off plug having brakes thereon which may be actuated from exteriorally of the pipe by ultrasonic frequencies to position same in the pipe.

Still another object of the invention is the provision of a close-off plug which may be moved through the pipe by hydraulic pressure, having a central passage therethrough closeable by a valve which may be actuated from exteriorally of the pipe by ultrasonic frequencies to either allow fluid to flow therethrough after it is stopped in the pipe in order to position additional plugs by hydraulic force, or to close off same to allow same to be moved through the pipe by hydraulic pressure.

A further object of the invention is the provision of inflatable close-off devices which may be positioned in the pipe and then inflated to close off a selected zone in the pipe where a plug is to be frozen.

Other and further objects of the invention will become apparent upon reading the detailed specification hereinafter following and by referring to the drawings annexed hereto.

DESCRIPTION OF THE DRAWINGS

Suitable embodiments of the invention are shown in the attached drawings wherein:

FIG. I is a partially sectionalized elevational view showing a heat exchanger positioned about a pipe, with a close-off plug positioned therein, and showing means to circulate coolant through the heat exchanger housing;

FIG. II is a diagrammatic view of the components for actuating the brake pads and the valve on the blocking plug hereinafter described;

FIG. III is a partially sectionalized perspective view of a preferred form of blocking plug positioned in the pipe;

FIG. IV is a partially sectionalized elevational view showing two blocking plugs attached in tandem, blocking off an area in the pipe within the heat exchanger; and FIG. V is a partially sectionalized elevational view of a modified form of blocking plug consisting of inflatable bags positioned within the pipe on opposite sides of the heat exchanger blocking off an area therein.

DESCRIPTION OF A PREFERRED EMBODIMENT

Numeral references are employed to designate the various parts shown in the drawings, and like numerals indicate like parts throughout the various figures of the drawings.

The numeral 1 indicates a oil or gas transmission pipe which is buried in the earth 3 and a section thereof has been exposed by an excavation 2.

An insulated heat exchanger casing 4 is positioned about the pipe 1. The casing 4 may be of any desired shape such as rectangular or round and is preferably separable consisting of halves 4a and 4b. The openings therein positioned about the pipe have seals 5 and 6 extending thereabout to seal between said openings and the pipe 1.

A blocking plug 7, which for purpose of illustration, is shown diagramatically in FIG. I, consists of a body 8, which may be either solid or have a central passage therethrough controlled by a valve as hereinafter described, has flexible sealing flanges 9 and 10 secured thereabout which are in wiping, sealing engagement with the inner wall of the pipe to effectively block and prevent convection currents from flowing longitudinally of the pipe past such sealing flanges. The plug 7 may be moved through the pipe by hydraulic pressure and stopped within the heat exchanger in the area where the ice plug is to be frozen within the pipe.

A coolant line 11, which is controlled by a suitable valve 12, extends through the upper wall of the casing 4 and is connected to an evaporator coil 13 in the lower portion of the casing 4. The evaporator coil 13 is connected with a return line 14. The evaporator coil 13 may be a part of a conventional refrigerated air conditioning system which would include a compressor, condensor connected in the circuit between the lines 11 and 14 so that liquid coolant would be admitted through the line 11 to the evaporator coil 13 where it expands to provide heat exchange for cooling the interior of the casing 4, and the expanded gas would pass outwardly through the line 14 for recompression by the compressor.

Liquid nitrogen could be employed as a coolant in which the liquid nitrogen would be admitted through the line 11, allowed to expand in the evaporator coil 13 and the gasified nitrogen would be expelled through a vent valve 15 to the atmosphere. Other freezing media within the casing 4 could be provided such as solidified carbon dioxide (dry ice) mixed with methanol as a heat transfer medium. In such event the dry ice and methanol mixture could be deposited in the casing 4 after removing a lid therefor, such as that shown at 50 in FIG. IV.

In any event the cooling media admitted to the casing 4 lowers the temperature to sufficient extent to solidify and freeze water disposed within the pipe 1. By reason of the blockage of convection currents by the wiper flanges 9 and 10 the ice would be quickly and uniformly formed in an elongated area defined by the space between the flanges 9 and 10.

FIG. III shows a preferred form of blocking plug employed with the method herein described and claimed.

As shown the tubular body 16 has a sealing flange support shell 17 disposed thereabout, having a reinforcing ring 18 on the outer surface thereof, and extending thereabout. A housing 19 is secured between the body 16 and the shell 17 for the electronic controls.

The sealing flanges 20 and 21 are made of resilient material such as a rubber composition and are mounted in channels 23 and 24 extending about outwardly extending flanges 23a and 24a at opposite ends of the shell 17. Preferably, the resilient flanges 20 and 21 are impregnated with metallic particles such as to provide for ultrasonic frequency conduction therethrough to thereby permit ready reception by the receiving transducer in housing 19.

Brake shoes 24 and 25 are provided in spaced relationship about the blocking plug 17. The brake shoes 24 and 25 are pivotally mounted to a sleeve 26 which is slidably disposed about the tubular body 16. The brake shoes 24 and 25 are attached to the sleeve 26 by means of pivoted links 28 and 29 and 33 and 34, respectively. The links 28 and 33 are pivotally attached to lugs 32 and 35 mounted on the sleeve 26, and the links 29 and 34 are pivotally attached between the nose plate 27 and the lugs 30 and 36 secured to the inner surface of the brake shoes 24 and 25. The inner ends of the links 28 and 33 are also pivotally attached to the lugs 30 and 36. It will be seen that the inward movement of the sleeve 26 will expand the linkage and thus push the brake shoes 25 and 30 outwardly into engagement with the inner wall of the pipe to thereby stop the movement of the blocking plug in the pipe.

The nose plate 27 is rigidly attached to the end of the tubular body 16 and has a passage 27a therethrough coinciding with the bore of the body 16.

The solenoid 37 is pivotally attached at one end to a lug 40 which is secured to the body 16. A movable rod 38 extends outwardly of the solenoid and is arranged to be moved inwardly thereof upon energization of the solenoid in the manner hereinafter described. The rod 38 is pivotally attached to a lug 39 which is secured to the sleeve 26. It will be seen that upon the inward movement of the rod 38 the sleeve 26 will be moved to the right as viewed in FIG. III, thereby expanding the links 28 and 29 and 33–34 to move the brake shoes 24 and 25 outwardly into engagement with the inner wall of the pipe.

A valve housing 41 is secured to the end of the tubular body 16, and has a flapper valve 42 disposed in an enlarged chamber therein. The flapper valve 42 is mounted on a pivot pin 43 which in turn rotatably extends through the wall of the valve housing and is pivotally attached to an arm 44. The arm 44 is pivotally attached at the other end to the rod 45 of a solenoid 46. The solenoid 46 is pivotally attached at the end opposite the rod 45 to a lug 47, which is secured to the outer surface of the body 16. Upon energization of the solenoid 46 in the manner hereinafter described the rod 45 is moved outwardly of the solenoid to thereby rotate the shaft 46 and open the valve 42 to allow flow of fluid through the bore of the body 16. The valve 42 would be closed while the blocking plug is being moved through the pipe by hydraulic pressure, but may be opened after the brake shoes 24 and 25 are set to hold the plug in place, to allow circulation of fluid through the bore of the body 16 to thereby permit application of hydraulic force to a like blocking plug downstream to move it into a selected position.

DESCRIPTION OF FIRST MOFIFIED FORM

In the form shown in FIG. IV the blocking plugs 51 and 52 have wiping flanges 53 thereon and are connected together by a cable 54. The blocking plugs 51 and 52 may be of the same form as described hereinbefore with reference to the preferred form, but are set in tandem to provide a longer freezing chamber therebetween.

However, the plugs can be separate plugs as shown which are moved in tandem by hydraulic pressure provided in the pipe. A modified form of heat exchange casing 4 is shown wherein a removable cover 48 is provided thereon, which may have a suitable gas vent 49 therethrough. The cover 48 may be secured in place by suitable bolts or other securing means 50. The cover 48 may be removed for the purpose of filling the heat exchange casing with a mixture of dry ice and methanol, or other heat conducting fluid, to thereby provide the freezing medium within the casing 4.

DESCRIPTION OF SECOND MODIFIED FORM

Another modified form of convection current blocking arrangement is shown in FIG. V which consists of inflatable bags 55 and 56, each having a stem 57 thereon with a central passage 58 therethrough communicating with the interior thereof and with a compressed gas filler line 66 controlled by suitable valve 67.

The stem 57 extends through an inner casing 60 which is secured about a passage 99 provided through the wall of the pipe 1.

A mounting saddle 61 is secured to the pipe by means of a plate 61a and by bolts 62 which extend through appropriate flanges 62a on the mounting saddle 61 and through the plate 61a below the pipe 1. It will be seen that the inflatable bags 55 and 56 may be inserted into the pipe by extending the stem 57 downwardly through the casing 60 with the bags in deflated condition. After being so inserted into the pipe gas or liquid under pressure can be admitted through line 66 to the interior of the bags 55 and 56, to expand same into sealing engagement with the inner wall of the pipe, to thereby provide an isolated area in the pipe between the bags 55 and 56 and within the heat exchanger 4 to prevent convection currents from flowing outwardly of said zone and to permit quick and uniform freezing of a plug in the pipe.

SOLENOID ACTUATING MEANS

Suitable means may be provided exteriorally of the pipe for actuating the solenoids 37 and 46 shown in the Form of FIG. III, to thereby actuate the brakes 24 and 25 and valve 42. A suitable form of such device is illustrated in FIG. II wherein an electronically actuated ultrasonic frequency signal generator 68 is shown, which is of conventional design. The output of the generator 68 energizes a transmitting transducer 69 of conventional design which converts the electrical energy of the signal into a continuous wave ultrasonic frequency signal of a frequency to which the receiving transducer 70 responds. The receiving transducer 70 senses the ultra-sonic continuous wave frequency at the frequency to which it is tuned and converts it to alternating electrical signals. Since the receiving transducer 70 passes only frequencies within a narrow band containing the tuned frequency, most noise frequencies are eliminated. The signal is passed through an amplifier 71 and to a signal processor rectifier 72. The signal is rectified into DC current and fed to the relay 73 for actuating the brake solenoid 37 on valve solenoid 46 ad the case may be. It is desirable that the brakes 24–25 and the valve 42 be capable of being actuated independently of each other and for this purpose it is desirable to provide two of such signal generating, receiving and rectifying circuits which transmit, receive and process different frequencies so as not to interfere with each other.

If desired means (not shown) could be provided for detecting a blocking plug prior to the time it reaches the position of the heat exchanger. Such equipment could employ a pulse-echo-ultra-sonic frequency technique wherein the passing of the plug would cause a variation in the ultra-sonic signal in which case the ultra-sonic detector would be located at a distance upstream from the test section where the blocking plugs are to be stopped. The ultrasonic detector would include a conventional pulse-echo type of ultrasonic frequency system including a transducer which would produce a series of ultrasonic pulses directed radially across the pipe. If the pipe is filled with air none of the generated pulses can travel across the diameter of the pipe, and no signal would be returned to the receiver, indicator unit. However, when the plug passes a pipe filled with water, the ultrasonic pulses would travel across the pipe, reflect from the opposite wall and return to the receiver-indicator where they would be detected either visually or orally. The specific detecting and operating mechanism hereinbefore indicated is of conventional design.

It will be seen that we have provided improvements in means for freezing plugs in a pipe to close off a testing area by pressure injection wherein the area within and adjacent to the heat exchanger disposed about the pipe is sealed and blocked off to prevent convection currents from flowing outwardly and inwardly of the freezing area. Further we have provided means for locating and positioning blocking plugs in the pipe without the necessity of breaking or rupturing the pipe and a method which provides for quick and uniform freezing of the plug in the pipe.

Having described our invention, we claim:

1. Apparatus for freezing a plug in a pipe comprising: a heat exchanger casing positioned about the pipe; heat exchange media within the casing about the pipe; at least one blocking plug within the pipe arranged to block off an area in the pipe within the casing, said blocking plug having a central passage therethrough and having a body with spaced resilient wiping flanges secured to the outer surface thereof; a valve in the passage; an ultrasonic frequency generator located exteriorally of the pipe; a receiver-rectifier located within the plug; and means actuated by the rectified signal to operate the valve.

2. The combination called for in claim 1 wherein the heat exchange media comprises an evaporator coil within the casing; and means for circulating coolant from exteriorally of the heat exchanger casing through the evaporator and outwardly thereof.

3. The combination called for in claim 1 wherein the heat exchange media comprises a mixture of solidified carbon dioxide and a heat transfer liquid.

4. A process of freezing liquid to form a plug in a pipe comprising the steps of: placing a blocking plug having a central passage therein in a pipe; closing the central passage; pumping liquid through the pipe to move the blocking plug longitudinally through the pipe by hydraulic force; stopping the blocking plug in the pipe; opening the central passage; and freezing liquid in the pipe adjacent the blocking plug.

5. Apparatus for freezing a plug in a pipe comprising: a heat exchanger casing positioned about the pipe; heat exchange media within the casing about the pipe; at least one blocking plug having a body with spaced resilient wiping flanges secured to the outer surface thereof, said blocking plug being positioned within the pipe and arranged to block off an area in the pipe within the casing; an ultrasonic frequency generator positioned exteriorally of the pipe; a receiver and rectifier device within the plug for receiving and rectifying the signal generated by the ultrasonic signal generator; brake means on the blocking plug; and means actuated by the rectified signal to apply said brake means to stop the blocking plug within the pipe.

* * * * *